Oct. 7, 1969    R. CONRAD    3,471,022
SWIMMING POOL FILTER
Filed July 19, 1967    2 Sheets-Sheet 1
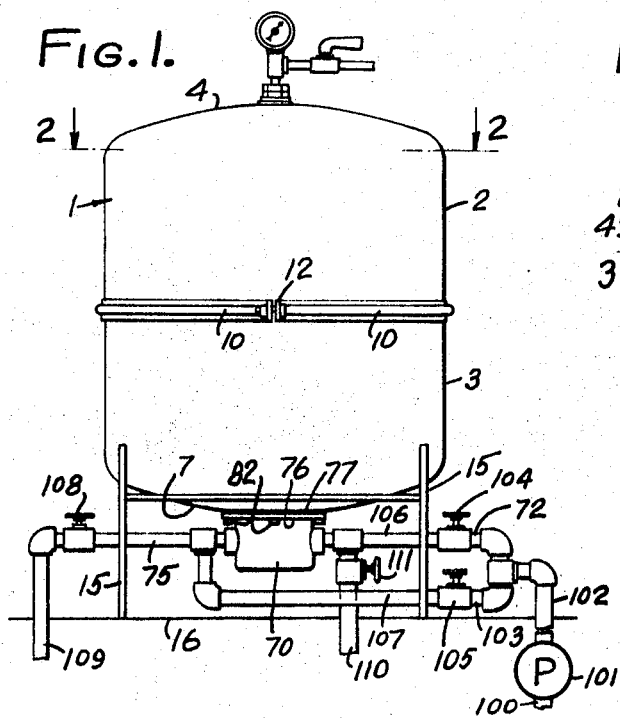
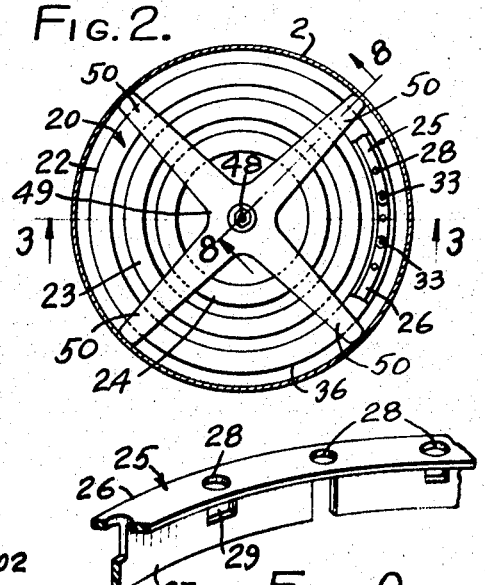
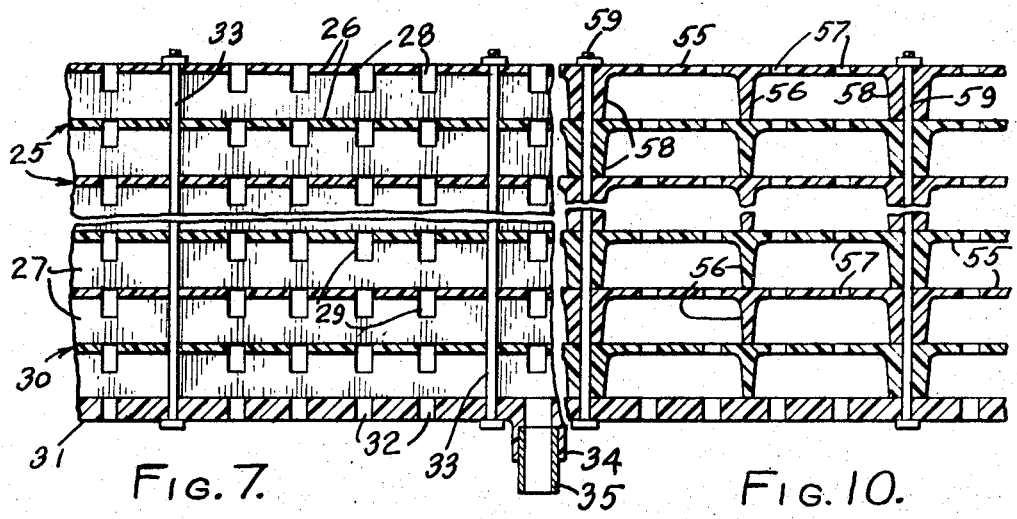
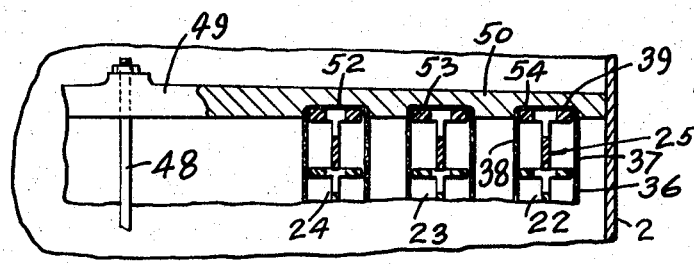
INVENTOR,
ROBERT CONRAD;
BY
ATTORNEY Oct. 7, 1969    R. CONRAD    3,471,022
SWIMMING POOL FILTER
Filed July 19, 1967    2 Sheets-Sheet 2
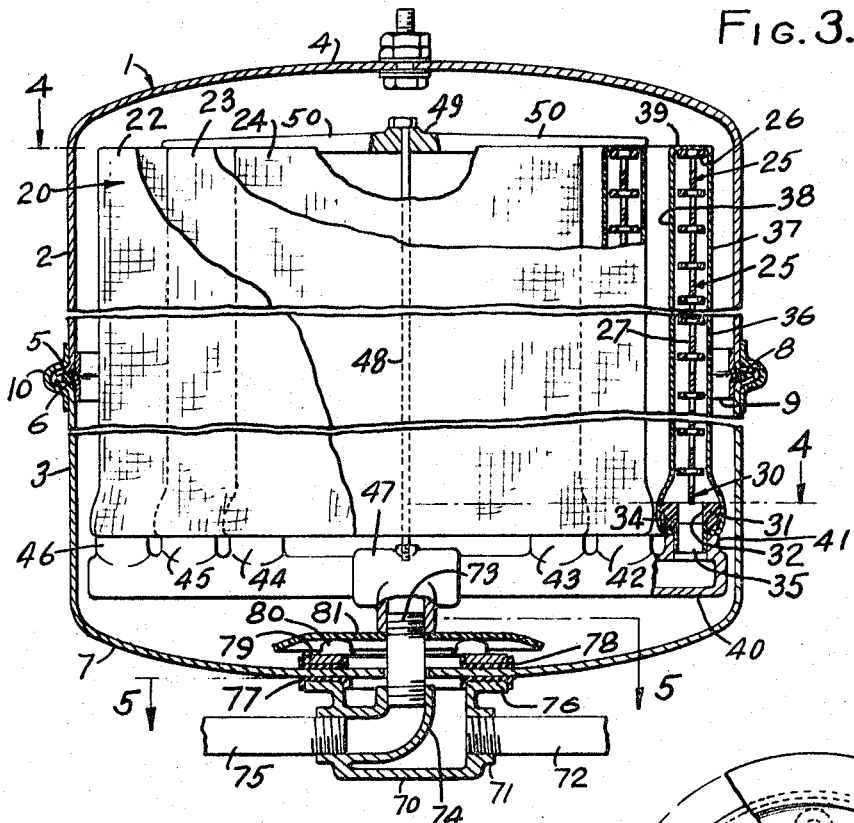
FIG. 3.
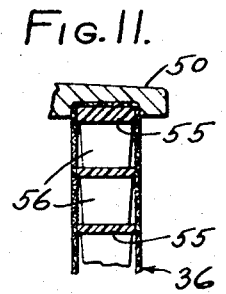
FIG. 11.
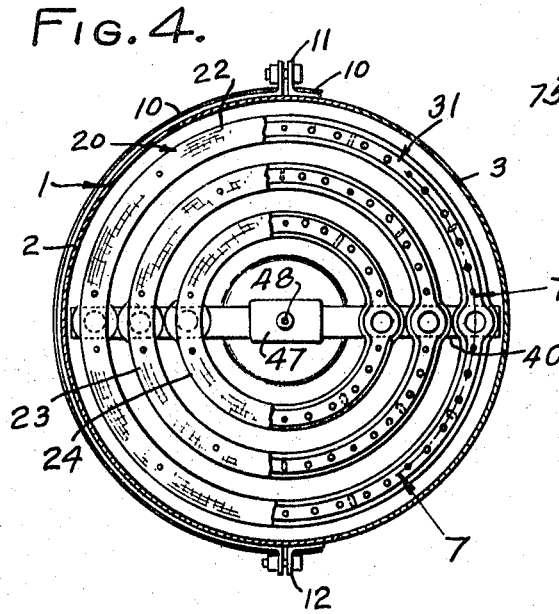
FIG. 4.
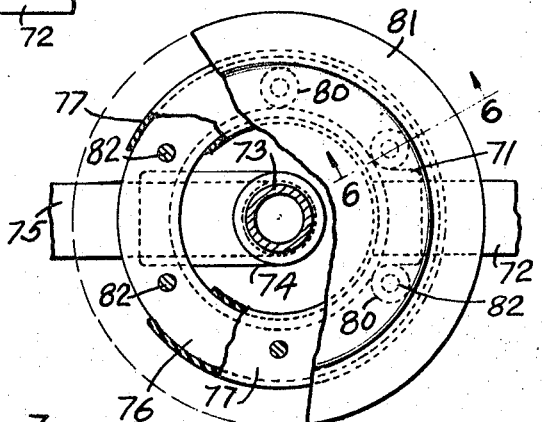
FIG. 5.
FIG. 6.
INVENTOR,
ROBERT CONRAD;
BY
*Melvin Brown,*
ATTORNEY

United States Patent Office 3,471,022
Patented Oct. 7, 1969

3,471,022
SWIMMING POOL FILTER
Robert Conrad, 4105 W. Burbank Blvd.,
Burbank, Calif. 91505
Filed July 19, 1967, Ser. No. 654,629
Int. Cl. E04h 3/20
U.S. Cl. 210—169   3 Claims

ABSTRACT OF THE DISCLOSURE

A filter unit comprising rings stacked in spaced axial alignment, with a filter envelope enclosing said stacked rings. The stacked rings are secured together and fastened to a manifold communicating with the interior of the envelope. Each ring is of T cross section with a series of holes in each ring to permit passage between the rings of a liquid passed through the envelope.

---

The present invention relates to a swimming pool filter adapted to effectively filter a large gallonage of water efficiently and quickly.

An object of the invention is to provide a swimming pool filter utilizing a filter envelope which will not collapse under high water pressure so as to cause the envelope to shut off or impair the flow of water therein.

A further object is a swimming pool filter utilizing an envelope in which the sides of the envelope are prevented from contacting under water pressure exerted upon both sides of the envelope and wherein the envelope is held in position without collapse at all times.

Every swimming pool filter restricts water passage therethrough with a constantly increasing back pressure and the present filter device is so constructed and arranged as to provide a series of stacked rings held in a separated, working relationship and enclosed within a filter envelope, the filter envelope being prevented from collapsing to shut off any water flow within the same by the ring construction. The inventor is aware that there are different methods used in the industry for preventing collapse of a filter envelope when under pressure conditions and usually a foam plastic of some form is utilized within the envelope in an attempt to prevent the sides of the envelope from collapsing or approaching each other to shut off water flow within the envelope. However, it has been found that such a method and means are unsatisfactory and do not accomplish the function desired.

Another object of the invention is to provide a filter device which requires very little attention on the part of the user, which is easily assembled and disassembled, will operate efficiently at all times, is not subject to rust and electrolysis, inexpensive in cost of manufacture and which is generally superior to filter devices now known to the inventor.

A further object is to provide a swimming pool filter device which utilizes filter aid and wherein the filter aid is immediately effective in a filtering operation after disuse of the filter device considered as an entirety.

A further object is to provide a swimming pool filter utilizing a filter aid and wherein the filter aid does not bridge filter elements to impair water flow of the filter elements.

In the drawings:

FIGURE 1 is a fragmentary elevation of the swimming pool filter device showing its general external appearance with piping connected thereto;

FIGURE 2 is a fragmentary sectional view on the line 2—2 of FIGURE 1;

FIGURE 3 is a fragmentary sectional view, on an enlarged scale, taken on the line 3—3 of FIGURE 2;

FIGURE 4 is a fragmentary sectional view on a reduced scale taken on the line 4—4 of FIGURE 3;

FIGURE 5 is a fragmentary partially sectional view, on a reduced scale and taken on the line 5—5 of FIGURE 3;

FIGURE 6 is a fragmentary sectional view, on an enlarged scale, taken on the line 6—6 of FIGURE 5;

FIGURE 7 is a fragmentary partially sectional view on an enlarged scale showing the stacked rings of the filter unit, taken on the line 7—7 of FIGURE 4;

FIGURE 8 is a fragmentary sectional view, on an enlarged scale, taken on the line 8—8 of FIGURE 2;

FIGURE 9 is an enlarged perspective view, partly in section of one of the rings shown in FIGURE 7;

FIGURE 10 is a fragmentary, sectional view of a modified form from that of FIGURES 7 and 9; and, FIGURE 11 is an enlarged transverse fragmentary sectional view of stacked rings of the type shown in FIGURE 10.

Referring now to the drawings, I have shown in FIGURE 1 a tank 1 having cooperating upper and lower members 2 and 3 which are adapted to house the filter units of the present invention. The tank is conventional in form and construction in that the upper member 2 has a dome shaped top 4 and an external flange 5 (FIGURE 3) at the open end thereof while the bottom member 3 is provided with a flange 6 which opens outwardly and a closed dome type bottom member 7. To provide a water tight fit between the upper and lower members of the tank, a ring gasket 8 is interposed between the flanges 5 and 6 with an interior ring 9 bearing against the inner walls of the upper and the lower members and against the gasket 8. A clamp ring 10 has two semi-circular members both having two plane flanges being in the same plane with an intermediate concave portion for holding flanges 5 and 6 together. The clamp ring members are provided with outstanding lugs at ends thereof, as shown in the FIGURE 4 at 11 and 12 with bolts and nuts for holding the lugs and the clamp ring in engagement with the two members of the tank. As shown in FIGURE 1, the tank may be supported by legs designated generally as 15 which are joined to lower member 3 of the tank and rest upon a foundation member as indicated at 16. Thus, the tank is held in an upright or vertical position.

A filter unit or device 20 is within the tank 1. In the present instance the filter unit is annular in form and a series of said units in concentric spaced relationship may be provided having like construction and differing from each other in diameter only as shown at 22, 23 and 24, see FIGURE 2. Filter unit 20 shown at 22 will be described and reference is made to FIGURE 3. The filter unit 20 comprises a series of like diameter concentric stacked rings 25, each ring having a flange 26 and a web 27, the web of each ring resting upon the flange of an adjacent ring as shown in said figure. Each ring is of T form in cross section (FIGURE 9) and each flange and each web is transversely bored at 28 and 29 respectively, the bores being in communication. In a filter unit of given depth, the web of the bottom ring 30 rests upon a ring 31 (FIGURES 3 and 7) which has a greater thickness, in the present instance, than the thickness of a flange 26 to give stability to the stacked rings. The rings 31 is transversely bored, as shown at 32 at spaced points throughout the ring, as illustrated in both FIGURES 7 and 10. It is intended that the core of each filter unit 20 should have the rings thereof secured together against shifting movement and accordingly tie bolts designated generally as 33 are provided at spaced points throughout the ring structure or core, the tie bolts being passed through holes in both the ring 31 and the flanges of each stacked ring. The tie bolts as shown in FIGURES 7 and 10 have one end headed and the opposite end screw threaded for reception of a nut. The arrangement is such that the base ring 31 is diametrically provided with fittings 34, and said fittings carry nipples 35. Surrounding the core for each filter unit 20, is a filter envelope or jacket 36 (FIGURE 3), the envelope having a pair of side members 37 and 38 which are closed at the upper end or top 39 with the lower ends thereof in communication with a manifold 40. The manifold lies diametrically of the tank 1 and has a series of fittings 41, 42, 43, 44, 45 and 46 which communicate outwardly as well as inwardly of the manifold. The fittings 41 and 46 are adapted to receive the diametrically arranged nipples 35 so that the nipples permit communication with the interior of the manifold and the interior of core portion of the filter unit. Specifically, the sides of the lower end of the envelope 36 are received between the fittings 41 and 46 and the base of the ring 31 to the end that there is a fluid tight fit between the envelope and the ring 31. Intermediate the length of the manifold is a fitting 47, and this fitting is adapted to receive a tie bolt 48 which holds a spider 39 (FIGURES 2 and 3) so that the equidistantly spaced arms 50 of the spider, of which there are four, may engage all of the top rings of each filter unit for holding the same tightly and securely within the tank 1. In this regard, the structure of FIGURE 8 is referred to and it will be noted that each arm 50 is grooved at spaced points, as shown at 52, 53, and 54 to maintain the spacing of the different filter units by positioning both the filter and the core and specifically the uppermost ring of each core unit within said grooves. The core structure for the filter units in FIGURES 10 and 11 is of slightly different form in that each ring of the stack, instead of being provided with an annular web secured transversely intermediate a flange, has a flat ring 55 provided with spaced depending transverse lugs 56. Ring 55 is provided with transverse bores 57 and the lugs of each ring rest upon the flat ring of an adjacent ring. The lugs 58 are of greater width and bored to receive tie bolts 59 for joining all of the rings of the core in working relationship which includes the base plate 31. As before, an envelope or jacket is adapted to surround the core and is secured to the manifold 40.

It has been found advantageous to provide a water or liquid distributor which comprises a casing 70, as shown in FIGURE 3, having a fitting at 71 for connection with a pipe 72 for admission within the casing of water or other liquid. Shown in FIGURE 3 is fitting 47 which is central of the manifold and has a nipple 73 secured thereto and to a fitting 74 within the casing 70 and which fitting 74 communicates with a pipe 75 for conducting clean or filtered water to a point of use. Casing 70 is flanged at 76 and this portion bears against the domed bottom 7, there being a gasket or washer 77 interposed between the flange 76 and said tank bottom. The interior of the tank bottom 7 is provided with a washer or gasket at 78 and with a ring 79 bearing against the washer or gasket. Ring 79 is provided with spaced apart protuberances 80 which protuberances support a diverter plate 81 of concavo-convex form and whereby liquid flowing into the casing 70 will pass into the tank between the protuberances and the diverter plate, thus directing the liquid outwardly radially within the tank.

As shown in FIGURES 3 and 6, the distributor casing 70 is held to the tank bottom 7 by means of a series of bolts 81 passed through aligned holes in flange 76, gaskets 77 and 78, threaded in ring 79. The diverter plate 82 is held in position by being centrally bored so as to be received upon the nipple 73 to bear against the end of fitting portion 47 and, likewise, against the protuberances 80. It has been found that this construction is sufficient to maintain stability of the parts.

The operation, uses and advantages of the invention are as follows.

The device of the present invention utilizes a filter aid material such as a slurry of diatomaceous earth which coats the exterior surfaces of the envelopes of the filter units. As is well known, the filter aid material will filter the water as the water passes through the envelopes into a return line for clear water directed to a pool or elsewhere.

It is highly essential that the envelopes of the filter units do not retard water flow through the same, which would result if the sides of the envelopes should contact. Accordingly, the use of a core of stacked rings held in working relationship becomes important to stabilize each filter unit to the end that the sides of the envelope are held separated without any tendency of the sides to move inwardly and obstruct fluid flow. A core for each filter unit having a series of stacked rings provided with flanges and webs, assures that the sides of the filter envelope do not contact when pressure is applied against the exterior surfaces of the envelope. As has been pointed out, certain manufacturers of filter devices in this art, utilize a foam plastic between the sides of the envelope in order to prevent the sides of the envelope from moving inwardly and contacting. This method, however, is not satisfactory in actual practice as it does not allow full liquid flow through the envelope within the same. As has been described, the core of each filter device is firmly attached to a manifold which conducts clear water which has been passed through the filter envelope or envelopes to flow into the manifold and outwardly thereof as required. When filter aid material is utilized on the external surfaces of the envelopes, the filter aid is usually maintained against the surfaces of the envelopes under pressure conditions. However, when the filter device, as an entirety is shut down, the filter aid material has a tendency to drop from the surfaces of the envelopes onto the bottom of the tank. The present device through use of the diverter plate and its spacing by means of protuberances 80, allows entering water to be directed radially within the tank and by being so directed will pick up the fallen filter aid material and again carry it in the stream of water against the filter envelopes. This maintains the integrity of the filter devices so that they function properly. The arrangement shown consisting of a series of spaced annularly arranged filter units each having a core of stacked rings, which assures that bridging of the filter aid does not occur between the different filter envelopes and thereby adds to the efficiency of the device. The use of communicating holes in the flange and web for the form of device shown in FIGURES 7 and 9, allows full flow of liquid within and outwardly of each filter unit. The form shown in FIGURE 10, likewise, is efficient in that the rings 55 are all provided with holes 57 and the rings may be held in stacked relationship by means of the spaced lugs 56 which rest upon the tops of adjacent rings. Actual use of the invention, as described is far superior to the use of grids which are enclosed within an envelope as the stacked rings provide a stable core able to resist internal and external pressures exerted upon the envelope. It is customary practice to provide a pipe 100 connected at one end to the induction port of a pump 101, the opposite end of pipe 100 leading to the pool and usually to a skimmer for preventing leaves from entering the pipe. A pipe 102 connects with the eduction port of the pump 101 and by suitable fittings interconnects pipes 72 and 103. In other words, pipe 102 communicates with both pipes 72 and 103. However, pipes 72 and 103 are provided with valves 104 and 105 respectively with a suitable pipe 106 connected to valve 104 which leads to the distributor casing 70. Pipe 103 connects at one end with valve 105 and the opposite end by pipe 107 by suitable fittings with pipe 75 at a position external the distributor casing 70 and particularly with the pipes which connect with the interior of the manifold 40. Pipe 75 is valved at 108 and beyond the valve, pipe 109 leads to the pool. Pipes 75 and 109 are known as clear water conduits or pipes while pipe 100 is the debris laden or unclean water pipe. A pipe 110 has a valved connection 111 with pipe 106 exterior the distributor casing 70. By closing or opening different valves, it is possible to have back flow of water and to remove debris from the tank. Thus water drawn from a pool by pump 101 flows into pipe 100 through a skimmer and following skimming, a slurry of filter aid material such as diatomaceous earth is fed under pump pressure by pump 101 into the filter tank 1. Accordingly, valves 105 and 111 are closed with the valves 104 and 108 open. The water containing slurry is then directed through pipes 72 and 106 into the distributor 70 flowing upwardly from the distributor into the tank 1, being diverted in its flow by the diverter plate 81 so as to assure even flow externally of the different envelopes or jackets of the filter units within the tank. Such a flow will cause the diatomaceous earth, if it is used, or other filter aid material to cover the exterior surface of the envelopes or jackets of each filter unit. Thus a slurry of filter aid material builds up on exterior surfaces only and will cover the entire envelope or jacket of each filter unit. The liquid to be filtered passes through the filter aid material and each fabric envelope or jacket within the envelope. The interior of the envelope communicates with the manifold 40, the manifold in turn being in communication with pipes 75 and 109 leading filtered water back to the swimming pool. Back flow of water may be accommodated by opening the valve 111 leading to pipe 110, which pipe in turn is in communication with a sump. Thus, upon closing valve 104, water under pressure may be directed into pipe 107 whereupon opening valve 105 and closing valve 108 water will be passed within the filter envelopes, if desired. If drainage of the filter tank is desired, the valves 104, 105 and 108 are closed and valve 111 opened. If reverse or back flow of liquid is desired, valves 104 and 108 are closed and valves 105 and 111 opened whereupon liquid under pump pressure will be directed through piping 107 and 75 within the filtering units and outwardly through drain pipe 110.

I claim:

1. A filter device for swimming pools including: a tank; a filter unit within the tank comprising a series of rings of like diameter in coaxial stacked relationship; means securing the rings together against shifting movement; each ring being a substantially solid T in cross section with a horizontal flange and a vertical web, the lower end of each vertical web standing on the flange of the next lower ring of the stack; each flange and web being bored in a multiplicity of places, and each bore of each flange being in communication with a bore in the web of the same ring; a fabric liquid-filtering jacket enclosing and fixed to the outside of the stack of rings; means for conducting the liquid to be filtered into the bottom of the tank so that the liquid rises and surrounds the fabric jacket and flows into the interior thereof; and means permitting flow of filtered liquid out of the jacket and out of the tank for delivery to a point of use.

2. The invention defined in claim 1, wherein the means for conducting the liquid to the tank delivers the liquid under a circular, generally horizontal diverter plate fixed to but spaced slightly above the center of the tank bottom on the inside and acting to direct the liquid radially outwardly in all directions; the liquid then rising in the tank to surround the fabric jacket and flow through the walls of said jacket; a manifold fixed near the bottom of the tank on the inside and connected to the lower end of the jacket to receive the liquid from within the jacket; and a pipe connected to the manifold for conducting the liquid thus filtered to the point of use.

3. A filter device for swimming pools including: a tank; a filter unit within the tank comprising a series of rings of like diameter in coaxial vertical stacked relationship; each ring being flat on top and provided all around with spaced depending transverse integral lugs which rest upon the flat upper surface of the adjacent ring below; the rings furthermore having bores at numerous points intermediate the spaced lugs permitting flow of a liquid vertically through the entire stack; some of the lugs at intervals around the ring being of substantially greater width than the other lugs and being bored vertically; and tie bolts passed through the aligned bores of the wider lugs to join all the rings in a rigid structure; a fabric liquid-filtering jacket enclosing and fixed to the stack of rings; means for conducting the liquid to be filtered into the bottom of the tank so that the liquid rises and surrounds the jacket and flows into the interior thereof; and means permitting flow of the filtered liquid out of the lower end of the jacket and out of the bottom of the tank for delivery to a point of use.

References Cited

UNITED STATES PATENTS

| | | | |
|---|---|---|---|
| 651,621 | 6/1900 | Black et al. | 210—342 |
| 2,835,389 | 5/1958 | Sharp | 210—456 X |
| 3,019,905 | 2/1962 | Baker et al. | 210—486 |
| 3,202,284 | 8/1965 | Wade | 210—456 X |
| 3,387,708 | 6/1968 | Salomon et al. | 210—342 X |

REUBEN FRIEDMAN, Primary Examiner

F. A. SPEARS, Jr., Assistant Examiner

U.S. Cl. X.R.

210—342, 346, 456, 487